United States Patent [19]

Ray et al.

[11] 4,406,762
[45] Sep. 27, 1983

[54] ELECTRON BEAM COAL DESULFURIZATION

[75] Inventors: Asim B. Ray; Paul L. Feldman, both of Bridgewater, N.J.

[73] Assignee: Research-Cottrell, Inc., Somerville, N.J.

[21] Appl. No.: 340,761

[22] Filed: Jan. 19, 1982

[51] Int. Cl.$^3$ ............................................. B01J 19/12
[52] U.S. Cl. ....................... 204/157.1 H; 204/158 HE
[58] Field of Search ................. 204/157.1 H, 157.1 P, 204/158 HE, 162 HE; 422/186

[56] References Cited

U.S. PATENT DOCUMENTS

| | | | |
|---|---|---|---|
| 833,573 | 10/1906 | Becigneul | 423/578 R |
| 2,040,682 | 5/1936 | Bacon et al. | 23/226 |
| 2,409,408 | 10/1946 | Tweeddale | 23/312 |
| 2,429,217 | 10/1947 | Brasch | 204/157.1 H |
| 3,102,792 | 9/1963 | Eads et al. | 23/294 |
| 3,389,971 | 6/1968 | Alliger | 23/277 |
| 3,565,777 | 2/1971 | Lauer | 204/157.1 R |
| 3,616,375 | 10/1971 | Inoue | 204/162 R |
| 3,653,185 | 4/1974 | Scott et al. | 55/103 |
| 3,869,362 | 3/1975 | Machi et al. | 204/157.1 R |
| 3,981,815 | 9/1976 | Taniguchi et al. | 204/157.1 R |
| 3,997,415 | 12/1976 | Machi et al. | 204/157.1 H |
| 4,004,995 | 1/1977 | Machi et al. | 204/157.1 H |
| 4,041,141 | 8/1977 | Moss | 423/573 |
| 4,066,738 | 1/1978 | Daman | 423/569 |
| 4,076,607 | 2/1978 | Zavitsanos et al. | 204/162 HE |
| 4,147,762 | 4/1979 | Steiner | 423/569 |
| 4,160,813 | 7/1979 | Markel et al. | 423/448 |
| 4,177,120 | 12/1979 | Zenty | 204/157.1 R |
| 4,219,537 | 8/1980 | Steiner | 423/569 |

OTHER PUBLICATIONS

Husack et al., Effect of Gamma Radiation on Anthracite, Bureau of Mines Report of Investigations 6391(1964) pp. 9–14, 24 and 28.

J. R. Bush, L. N. Menegozzi, P. L. Feldman, "Removal of $NO_x$ and $SO_2$ from Flue Gases Using Electron Beam Irradiation", Report No. COO-4902-1, submitted to U.S. Dept. of Energy on Jan. 25, 1980; Title page, pp. 1–7, 17–20, 23–27, 36–37.

Primary Examiner—Howard S. Williams
Attorney, Agent, or Firm—Kerkam, Stowell, Kondracki & Clarke

[57] ABSTRACT

Converting both organic and inorganic sulfur compounds in coal to removable forms utilizing electron beam irradiation. The removable forms of sulfur include elemental sulfur, gaseous compounds, and water-soluble compounds. Coal is pulverized and slurried and introduced into the electron beam reaction chamber where the conversion reactions take place. As a further benefit, coal dechlorination inherently results.

8 Claims, 1 Drawing Figure

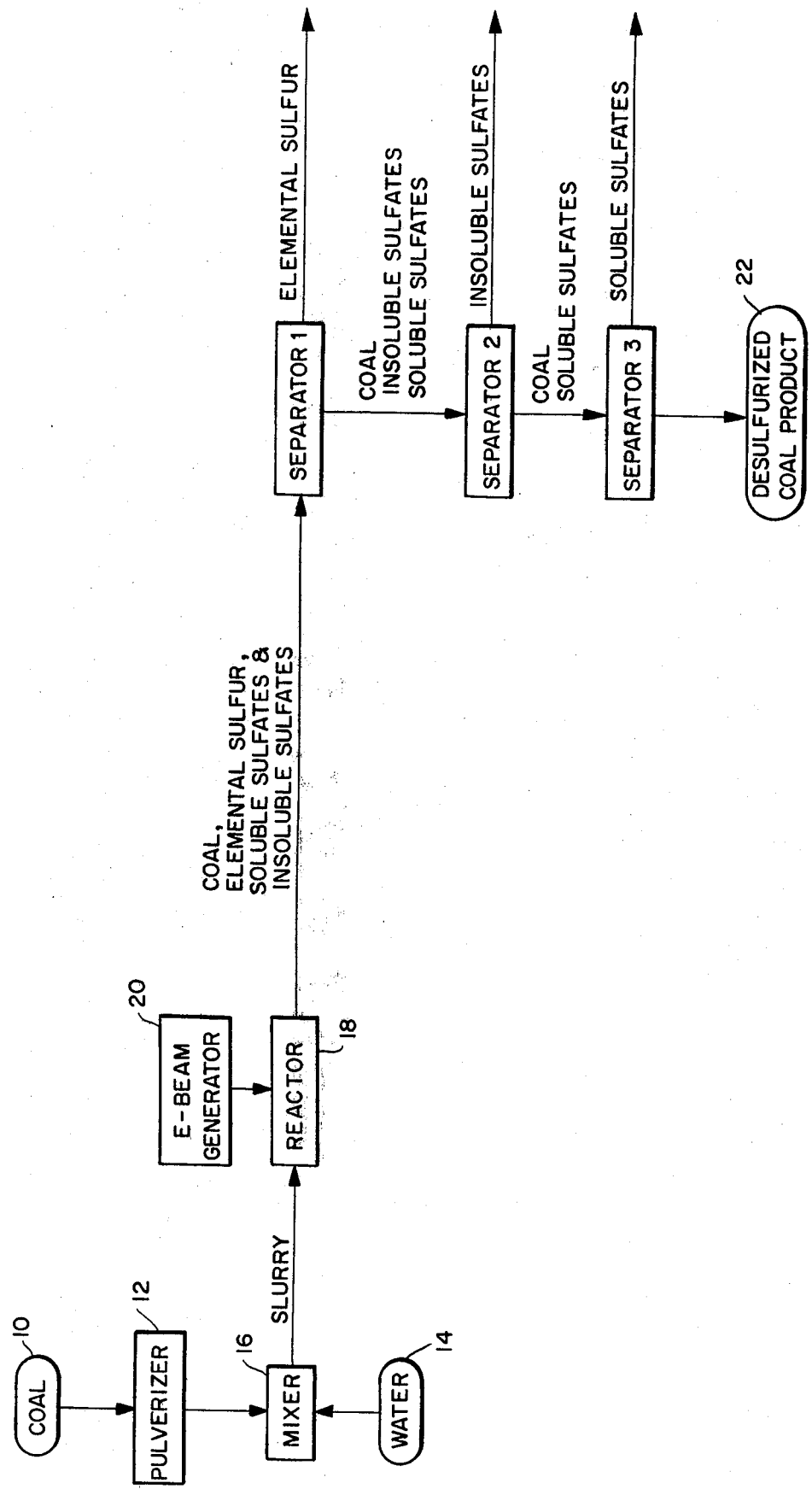

4,406,762

ELECTRON BEAM COAL DESULFURIZATION

BACKGROUND OF THE INVENTION

The present invention relates to coal desulfurization and, more particularly, to efficient and cost-effective means for removing both organic and inorganic sulfur compounds from coal.

A particular atmospheric pollutant of environmental concern is sulfur dioxide ($SO_2$) produced during the burning of sulfur-containing coal, and it is accordingly a desirable goal to minimize the generation of sulfur dioxide. There are two general approaches which may be employed: the use of low-sulfur coal as fuel, and removal of the sulfur dioxide from the flue gas subsequent to combustion.

There is a relative abundance of high-sulfur coal, making effective sulfur removal processes and equipment quite attractive. Previous approaches, as mentioned briefly above, have been largely directed to removal of sulfur dioxide from combustion products. This is, however, inherently difficult because sulfur dioxide is a gas, in contrast to a particulate, which is somewhat easier to remove through filtering processes, particularly electrostatic filtering.

As an alternative, various processes have been proposed for removal of sulfur from the coal prior to combustion. One known process for removing inorganic sulfur compounds from coal is known as the Meyer process, and is based on the reaction of sulfur-bearing coal with $Fe_2(SO_4)_3$. Another known coal desulfurization process is the NaOH-Air fusion process, which depends upon the formation of peroxide and OH radicals.

Particularly pertinent in the context of the present invention is one of the processes disclosed in Zenty U.S. Pat. No. 4,177,120, which discloses the desulfurizing of coal by solar radiation in a suitable gaseous environment, specifically, in the absence of molecular oxygen and in the presence of $CO_2$. In particular, the process which Zenty proposes apparently proceeds according to the following chemical reaction:

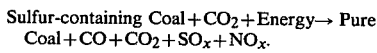
Sulfur-containing Coal + $CO_2$ + Energy → Pure Coal + CO + $CO_2$ + $SO_x$ + $NO_x$.

Also worthy of some note in the context of the present invention is the disclosure of Inoue U.S. Pat. No. 3,616,375, which proposes the desulfurization of liquid and gaseous organic compounds such as petroleum by imparting energy to the sulfur species directly, via physical means, such as: (1) impulsive electric discharge, (2) sonic vibrations, (3) laser, (4) microwave energy, or (5) high frequency electrostatic field. Based on our analysis, the success of the Inoue process depends upon the ability to transfer appropriate amounts of energy directly to the sulfur species, aided considerably by the nature of the liquid and gaseous hydrocarbons employed, wherein all the constituent molecules are in constant motion and essentially uniformly distributed. This randomness of distribution apparently enhances the likelihood of transferring energy directly to the sulfur-bearing molecule.

Also relevant in the context of the present invention is the invention comprising the subject matter of commonly-assigned application Ser. No. 226,853, filed Jan. 21, 1981, U.S. Pat. No. 4,372,832 by John R. Bush, entitled "Pollution Control by Spray Dryer and Electron Beam Treatment". Bush discloses a particular combination of spray drying and electron beam treatment for effluent gasses for converting gaseous sulfur oxides and nitrogen oxides into mist and/or solid particles, which may then be subjected to dry particulate collection.

By the present invention there are provided electron beam processes and apparatus for desulfurizing coal prior to combustion.

SUMMARY OF THE INVENTION

Accordingly, it is an object of the invention to provide processes and apparatus for effectively desulfurizing solid coal by removing both organic and inorganic sulfur compounds.

Briefly, and in accordance with an overall concept of the invention, methods and means are provided for converting, utilizing electron beam irradiation, organic and inorganic sulfur compounds in coal to removable forms and then removing the forms.

Removable forms of sulfur dioxide include elemental sulfur (melting point 118.2° C.) which may be removed either by melting or by solvent extraction, gaseous compounds which can be swept away in a stream of air, water-insoluble sulfur compounds which can be filtered, and water-soluble sulfur compounds which can be washed away. In the processes of the present invention, the coal is reacted with the electron beam in the presence of water and, particularly, in the presence of free radicals generated from the water by the action of the electron beam. In addition to the presence of water, a significant aspect of the present invention is that the coal is pulverized to a powder and slurried in water. Not only does this provide the necessary water, but it inherently makes the distribution of the sulfur compounds much more uniform to increase the efficiency of transferring energy from the electron beam.

Briefly, and in accordance with a more particular aspect of the invention, a process for removing organic and inorganic sulfur compounds from coal comprises slurrying pulverized coal in water, irradiating the slurry with an electron beam to convert the sulfur to removable forms, and removing the removable forms of sulfur from the coal slurry. The coal preferably is pulverized to a powder of approximately −60 to +200 mesh. The electron beam power is such that a dose in the order of at least 1.58 megarads is supplied to the coal.

Briefly, and in accordance with another aspect of the invention, apparatus for removing organic and inorganic sulfur compounds from coal comprises a coal pulverizer, a mixer for pulverized coal and water to produce a coal slurry, an electron beam reactor for irradiating the coal slurry with an electron beam to convert the sulfur to removable forms, and a device for removing the removable forms of sulfur from the coal slurry. The removable forms of sulfur may include molten elemental sulfur, and the device for removing such sulfur comprises a filter for separating desulfurized coal from a mixture of superheated water and molten sulfur, a cooler for solidifying the sulfur, and a filter for separating solidified sulfur from water.

As a further benefit and advantage of the invention, coal dechlorination inherently results from the subject desulfurization process.

BRIEF DESCRIPTION OF THE DRAWING

While the novel features of the invention are set forth with particularity in the appended claims, the invention, both as to organization and content, will be better understood and appreciated, along with objects and features thereof, from the following detailed description taken in conjunction with the drawing, in which:

The single FIGURE is a block diagram depicting a coal desulfurization process in accordance with the invention, and apparatus for implementing the process.

DESCRIPTION OF THE PREFERRED EMBODIMENTS

As summarized hereinabove, an important aspect of the invention involves irradiating a slurry of pulverized coal with an electron beam to convert the sulfur to removable forms and removing the removable forms of sulfur from the coal slurry. With reference to the drawing FIGURE, sulfur-containing coal 10 is supplied to a pulverizer 12 wherein the coal is converted to a powder having a particle size preferably in the range of from approximately −60 to +200 mesh. The pulverized coal is then slurried by mixing with water 14 in a mixer 16, and then supplied to a reactor 18. Within the reactor 18, the coal slurry is irradiated with a beam from an electron beam generator 20, having energy such that a dose in the order of at least 1.58 megarads is supplied to the coal.

The form of reactor 18 may be relatively uncomplicated. For example, the reactor may comprise simply a pipe sufficiently transparent to the electron beam. Either the pipe material may be so transparent or the pipe may be provided with a window (not shown). The pipe or the window, as the case may be, may be formed of a material such as titanium or plastic. For treatment of maximum cross-sectional area, it is preferable to irradiate the pipe from at least two sides with separate electron beams.

In the reactor 18, sulfur in the coal, comprising both organic and inorganic sulfur compounds, is converted to removable forms by means of processes described more fully hereinafter. The removable forms of sulfur include elemental sulfur, water-soluble compounds such as soluble sulfates, water-insoluble sulfur compounds such as insoluble sulfates, and gaseous sulfur compounds.

The gaseous sulfur compounds may be removed simply by sweeping them away in a stream of air.

Downstream of the reactor 18 are a series of three Separators 1, 2 and 3 for successively separating out elemental sulfur, insoluble sulfates and soluble sulfates, respectively, to leave a desulfurized coal product 22. Although not depicted in the FIGURE, preferably water from the operation of the Separators 1, 2 and 3 is recirculated to re-enter the process at 14. It will be appreciated that such separators are conventional chemical processing devices such as filters and washers and that specific separator types are selected for specific applications on the basis of chemical engineering and economic considerations, quite apart from the overall concept of the subject invention. It will further be appreciated that a relatively generalized process is illustrated, and that numerous variations and modifications of the three-stage process illustrated are possible.

By way of specific example, a separator for removing elemental sulfur, such as the Separator 1, operates by taking advantage of the relatively low 118.2° C. melting point of sulfur. In particular, a mixture of superheated water and molten sulfur is created, either through heat generated within the reactor 18 itself, or by supplemental heat injection such as steam injection. Within such a separator, this mixture is passed to a filter (not specifically shown) which separates the desulfurized coal from the mixture of molten sulfur and superheated water. This mixture is cooled in a cooler (not shown) so as to solidify the sulfur, which is then separated from the water by means of another filter (not shown). Water from the filter 22 is then re-used in the mixer 12 to slurry incoming pulverized coal.

Alternatively, a separator for molten sulfur may employ solvent extraction process.

Several specific chemical reactions by which the sulfur in the coal is converted to removable forms will now be described with reference to the following chemical reaction equations. While the reaction equations and discussion presented hereinbelow are presently believed to accurately describe the mode of operation, applicants in no way intend to be bound by the particular chemical reaction equations presented herein.

First, the reaction of the electron beam with the water produces various species such as H (hydrogen atoms), OH (hydroxyl radicals), H$_2$ (hydrogen), and H$_2$O$_2$ (hydrogen peroxide) through the following reaction processes:

$$H_2O + h\nu \rightarrow H_2O^+ + e \quad (1)$$

$$H_2O + H_2O \rightarrow H_3O^+ + \cdot OH \quad (2)$$

$$e + H_2O \rightarrow \cdot OH + H + e' \quad (3)$$

(where e' has lower energy than e)
$$2OH \rightarrow H_2O_2 \quad (4)$$

$$2H \rightarrow H_2 \quad (5)$$

The following reactions occur among the above species and the various forms of sulfur in coal. First shown are reactions with inorganic sulfur compounds in the form of pyrite, followed by reactions with organic sulfur compounds.

With pyrites:

$$FeS_2 + 2H \rightarrow FeS + H_2S \quad (6)$$

H$_2$S is a gas. Although FeS is insoluble, it is subsequently converted to soluble FeSO$_4$ in accordance with Equation (8), below, $$2FeS_2 + 16H_2O_2 \rightarrow Fe_2(SO_4)_3 + H_2SO_4 + 16H_2O \quad (7)$$

Fe$_2$(SO$_4$) and H$_2$SO$_4$ are both water-soluble.

$$FeS + H_2SO_4 \rightarrow FeSO_4 + H_2S \quad (8)$$

FeSO$_4$ is water soluble.

The H$_2$S produced in accordance with Equation (6) above need not be swept away, but can be converted to elemental sulfur as follows:

$$H_2S + H_2O_2 \rightarrow S + 2H_2O \quad (9)$$

Other reactions occurring are $$Fe_2(SO_4)_3 + H_2S \rightarrow 2FeSO_4 + H_2SO_4 + S \quad (10)$$

$$2FeS_2 + 32 \cdot OH \rightarrow Fe_2(SO_4)_3 + H_2SO_4 + 16H_2O \quad (11)$$

$$Fe_2(SO_4)_3 + FeS \rightarrow 3FeSO_4 + S^* \quad (12)$$

To summarize, in the reactions with pyrites, elemental sulfur is formed, gaseous $H_2S$ is formed, and water-soluble $Fe_2(SO_4)_3$, $H_2SO_4$ and $FeSO_4$ are formed. All of these are removable forms of sulfur.

With Organic Sulfur Compounds in Coal:

$$R_2S + 2H \longrightarrow R=R + H_2S \quad (13)$$

organic sulfur compound in coal $$H_2S + H_2O_2 \longrightarrow 2H_2O + S^o \quad (14)$$

$$R_2S + 2.OH \longrightarrow R_2O + H_2O + S^o \quad (15)$$

$$R_2S + H_2O_2 \longrightarrow R_2SO + H_2O \quad (16)$$
sulfoxide $$R_2S + 2H_2O_2 \longrightarrow R_2SO_2 + 2H_2O \quad (17)$$
sulfone $$R_2S + H_2 \longrightarrow R=R + H_2S \quad (18)$$

$$R=R + H_2 \longrightarrow 2RH \quad (19)$$

Generally, $R_2O$, $R_2SO$, and $R_2SO_2$ are water-soluble, and thus removable by washing.

Finally, as a further benefit, coal dechlorination inherently results as a consequence of the subject desulfurization. The following equations describe reactions with organic chloric compounds:

$$RCl + .OH \rightarrow RO. + HCl \quad (20)$$

$$RO. + H \rightarrow ROH \text{ (alcohol)} \quad (21)$$

$$RO. + .OH \rightarrow ROOH \text{ (acid)} \quad (22)$$

$$RCl + H_2 \rightarrow RH + HCl \quad (23)$$

The hydrogen chloride (HCl) is water-soluble and is easily removed by washing.

Accordingly, it will be appreaciated that the present invention provides effective and efficient means for the desulfurization of coal.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A process for removing organic and inorganic sulfur compounds from coal comprising slurrying pulverized coal in water, irradiating the slurry with an electron beam to convert the sulfur to removable forms, and removing the removable forms of sulfur from the coal slurry.

2. A process in accordance with claim 1, wherein the coal is pulverized to approximately $-60$ to $+200$ mesh.

3. A process in accordance with claim 1, wherein the removable forms of sulfur include elemental sulfur.

4. A process in accordance with claim 3, which comprises removing the elemental sulfur by melting to form a mixture of molten sulfur and superheated water.

5. A process in accordance with claim 3, which comprises removing the elemental sulfur by solvent extracton.

6. A process in accordance with claim 1, wherein the removable forms of sulfur include gaseous sulfur compounds.

7. A process in accordance with claim 1, wherein the removable forms of sulfur include water-soluble sulfur compounds removable by washing.

8. A process in accordance with claim 1, wherein a dose is supplied to the slurry in the order of at least 1.58 megarads.

* * * * *